(12) United States Patent
Melin et al.

(10) Patent No.: US 9,012,809 B2
(45) Date of Patent: Apr. 21, 2015

(54) WELDING CONTROL

(75) Inventors: Bo Melin, Laxå (SE); Per Östergren, Vretstorp (SE); Håkan Larsson, Laxå (SE); Bo Jansson, Älgarås (SE); Lars E. Jansson, Lyrestad (SE)

(73) Assignee: ESAB AB, Gothenburg (SE)

( * ) Notice: Subject to any disclaimer, the term of this patent is extended or adjusted under 35 U.S.C. 154(b) by 708 days.

(21) Appl. No.: 13/139,287

(22) PCT Filed: Oct. 9, 2009

(86) PCT No.: PCT/SE2009/051134
§ 371 (c)(1),
(2), (4) Date: Jul. 20, 2011

(87) PCT Pub. No.: WO2010/080057
PCT Pub. Date: Jul. 15, 2010

(65) Prior Publication Data
US 2011/0297656 A1    Dec. 8, 2011

(30) Foreign Application Priority Data
Jan. 9, 2009 (SE) .................................. 0900017

(51) Int. Cl.
*B23K 35/30* (2006.01)
*B23K 9/12* (2006.01)
(Continued)

(52) U.S. Cl.
CPC ............ *B23K 9/0216* (2013.01); *B23K 9/1278* (2013.01)

(58) Field of Classification Search
USPC ........................... 219/136–137 R, 124.1–126
See application file for complete search history.

(56) References Cited

U.S. PATENT DOCUMENTS

| 2,489,002 | A | * | 11/1949 | Babbitt ........................... 219/73 |
| 2,670,423 | A | | 2/1954 | Darner et al. |
| 2,749,421 | A | * | 6/1956 | Mikulak et al. .......... 219/124.22 |

(Continued)

FOREIGN PATENT DOCUMENTS

| EP | 0423088 A1 | 4/1991 |
| JP | 48072057 A | 9/1973 |

(Continued)

OTHER PUBLICATIONS

English Machine Translation of JP 7-116846 of May 9, 1995.*

(Continued)

*Primary Examiner* — Sang Y Paik
(74) *Attorney, Agent, or Firm* — Kacvinsky Daisak Bluni PLLC

(57) ABSTRACT

A welding device applies weld material between two work pieces such that the work pieces are connected mechanically with one another. The welding device includes a welding head and a central element. The welding head performs a welding action during transport thereof along an operating direction between the work pieces. Two primary sensor members are arranged on the central element upstream of the welding head relative to the operating direction. The sensor members register geometric properties of a spacing between the work pieces in which spacing the weld material is to be applied. Each sensor member is configured to maintain contact with a respective wall of the two work pieces adjoining the spacing while allowing variation of lateral distances between the central element and the adjoining wall. This is accomplished by the sensor members being pivotally attached to the central element via at least one pivoting axis oriented essentially perpendicular to the operating direction.

14 Claims, 3 Drawing Sheets

(51) Int. Cl.
B23K 9/02 (2006.01)
B23K 9/127 (2006.01)

(56) References Cited

U.S. PATENT DOCUMENTS

| | | | | |
|---|---|---|---|---|
| 3,197,604 | A | * | 7/1965 | Turbyville, Jr. et al. ........ 219/73 |
| 3,462,579 | A | * | 8/1969 | Nelson et al. ............ 219/124.34 |
| 3,612,818 | A | | 10/1971 | Bechtle et al. |
| 4,368,375 | A | * | 1/1983 | Merrick et al. .......... 219/125.12 |
| 5,493,097 | A | * | 2/1996 | Gustafsson et al. ...... 219/137 R |
| 6,627,839 | B1 | * | 9/2003 | Luckowski et al. ........ 219/76.14 |

FOREIGN PATENT DOCUMENTS

| | | |
|---|---|---|
| JP | 52073142 U | 6/1977 |
| JP | 59209483 A | 11/1984 |
| JP | 3478572 A | 10/1993 |
| JP | 7116846 A | 5/1995 |
| WO | WO2009005174 A1 | 1/2009 |

OTHER PUBLICATIONS

International Search Report for PCT/SE2009/051134 dated Jan. 19, 2010.

* cited by examiner

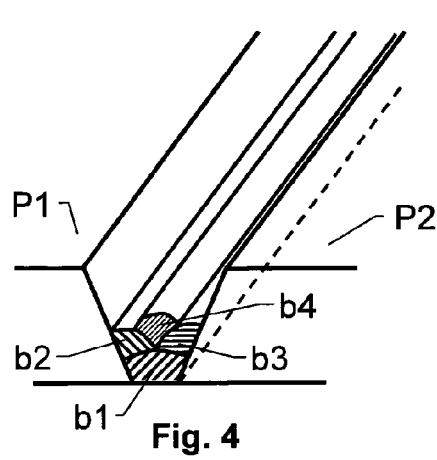
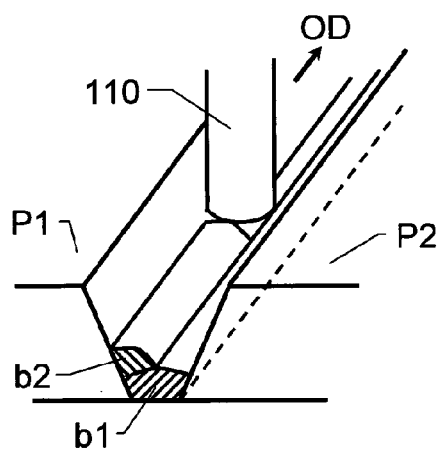
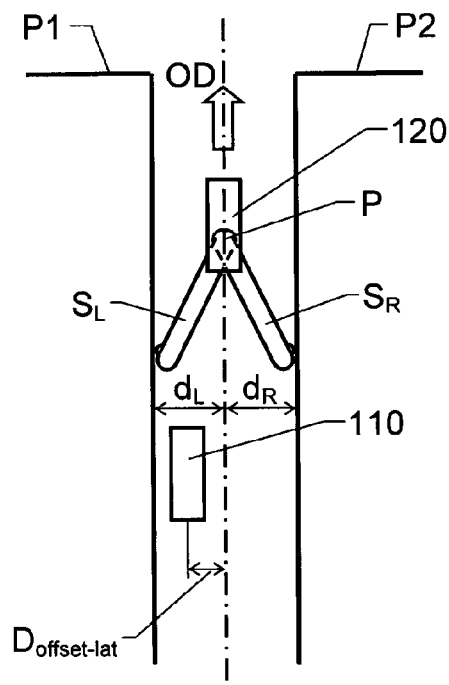
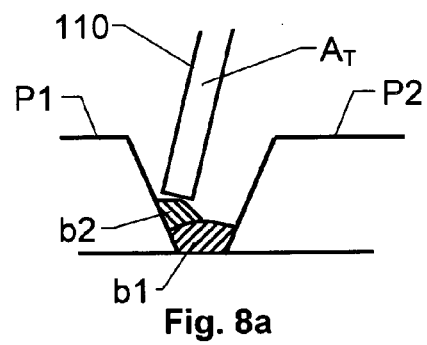
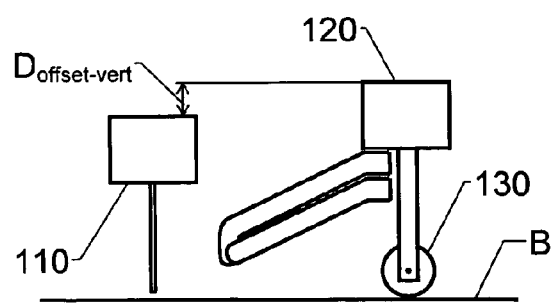
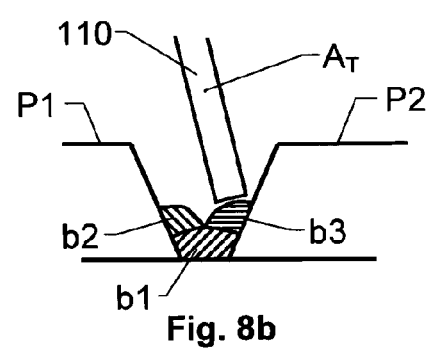

WELDING CONTROL

THE BACKGROUND OF THE INVENTION AND PRIOR ART

The present invention relates generally to precision welding. More particularly the invention relates to a welding device according to the preamble of claim 1.

Technical solutions for automatic welding have been known for decades. Below follows some examples of how a welding device can be controlled to apply welding material between two work pieces so as to connect these mechanically with one another.

EP 423 088 discloses a method for automatic multi-run welding of butt joints. Here, a sensor having a feeler rod with a ball-shaped tip oscillates transverse to the weld joint to scan the joint at several portions. Thus, the sensor determines a contour of the joint, and the welding can be adapted accordingly as the welding device progresses through the joint.

JP 59209483 describes a solution for detecting a groove width and in response thereto controlling a welding process. A pair of stylus sensors slides orthogonally across the groove, and a displacement meter determines the width of the groove based on contacts between the sensor and the groove at various points.

U.S. Pat. No. 3,612,818 reveals an arrangement for controlling the application of weld metal in electric welding. According to one described alternative the geometric properties of a V-joint is detected via a pair of scanning rolls, which are pressed against the edges of the joint. The rolls are mounted on a carriage where they are hinged on a common point of rotation.

This design is advantageous compared to the former because it allows a continuous measurement of the joint properties. Thus, a relatively high accuracy can be attained. However, due to the design, the arrangement is limited to be applied in joint profiles where the joint edges deviate considerably from being fully vertical surfaces. For example, the arrangement cannot be used in joints where the edges constitute essentially parallel surfaces. Particularly, it is impossible to use the arrangement for welding comparatively thick work pieces with narrow joints having steep edges.

SUMMARY OF THE INVENTION

The object of the present invention is therefore to alleviate the above problems and offer a robust, flexible and cost efficient solution for automatic application of weld material in narrow joints.

According to the invention, the object is achieved by the initially described arrangement, wherein the central element includes at least one pivoting axis around which the respective primary sensor member is configured to be pivoted. Here, each pivoting axis is oriented essentially perpendicular to the operating direction.

This device is advantageous because the design thereof allows any angle between the joint walls. Thus, arbitrary joint profiles can be handled, including parallel walls, also in case the joint is very narrow.

According to one preferred embodiment of the invention, the welding device includes an auxiliary sensor means configured to register a vertical distance between the welding head and a bottom surface of the spacing between the work pieces. Preferably, the auxiliary sensor means, in turn, includes a roller member, and the auxiliary sensor means is configured to maintain contact between the roller member and the bottom surface during transport of the device along the operating direction. Thereby, the vertical distance to the bottom surface may likewise be determined continuously. Naturally, this is beneficial from a quality point-of-view.

According to another preferred embodiment of the invention, the device is configured to travel in the operating direction along at least two essentially parallel paths between the work pieces, where each path results in the application of a separate weld bead. Hence, multiple weld beads may be used to fill the joint.

According to still another preferred embodiment of the invention, the device is configured to vary a position of the welding head relative to a position of the central element. The position relationship between the welding head and the central element is preferably varied in at least one direction being essentially perpendicular to the operating direction. Thereby, weld material can be applied along two or more paths between the work pieces in a straightforward manner. Furthermore, it is preferable if the position relationship between the welding head and the central element is variable in a direction being essentially perpendicular to a bottom surface of the spacing between the work pieces. Hence, the distance between the welding head and the weld surface may be further optimized.

According to yet another preferred embodiment of the invention, either as an alternative or a complement to the above, the welding head is configured to be tilted around a tilt axis that is essentially parallel to the operating direction. Consequently, the welding action can be conveniently aimed at different areas inside the joint.

According to a further preferred embodiment of the invention, the welding device includes a powder channel configured apply welding powder in the spacing between the work pieces. The powder channel has an outlet, which is arranged upstream of the welding head and downstream of the primary sensor members relative to the operating direction during transport of the device along this direction. Thus, an adequate amount of powder can be applied without risking interfering with the measurement of joint profile's geometric properties.

According to another preferred embodiment of this aspect of the invention, the welding head is configured to administer at least one consumable electrode wire into the spacing between the work pieces. Additionally, it is preferable if the welding head has at least two wire outputs, which are configured to feed out a respective electrode. Moreover, the outputs are arranged such that a stick-out of a first electrode is angled relative to a stick-out of a second electrode. Consequently, the welding process can be made very efficient. It is also rendered possible to further adapt the welding to the properties of the joint.

Generally, the invention is beneficial because it enables high-precision welding in narrow joints with steep edges. The solution is therefore well suited for welding of reactor tanks and other demanding junctions of thick metal plates.

Additional advantages, advantageous features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

FIG. 4 shows a schematic perspective view of a joint containing multiple weld beads;

FIG. 5 illustrates schematically how multiple weld beads may be applied in a joint according to one embodiment of the invention;

FIG. 6 shows a schematic top view of the proposed weld device according to one embodiment of the invention;

FIG. 7 shows a schematic side view of a weld device according to one embodiment of the invention; and FIGS. 8a-b illustrate how the welding head may be tilted according to one embodiment of the invention.

DESCRIPTION OF PREFERRED EMBODIMENTS OF THE INVENTION

Figure 1:
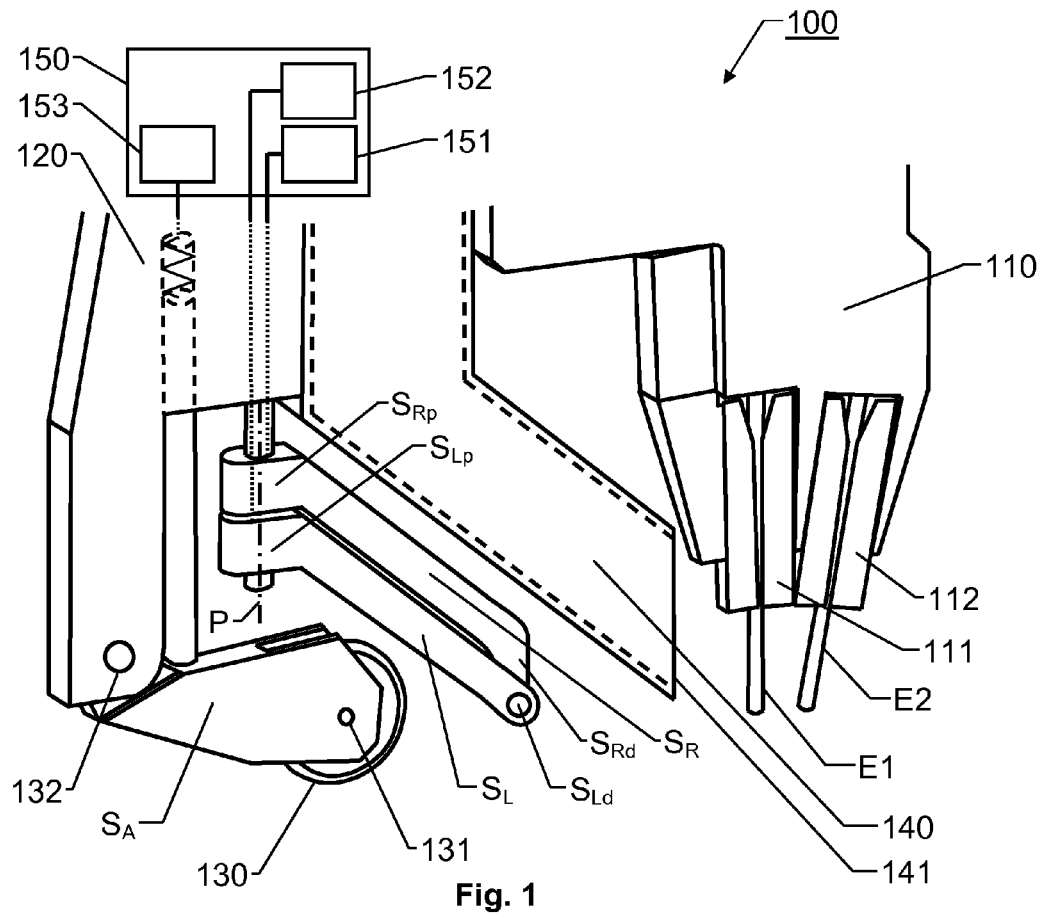
FIG. 1 shows a welding device according to one embodiment of the invention.
Figure 2:
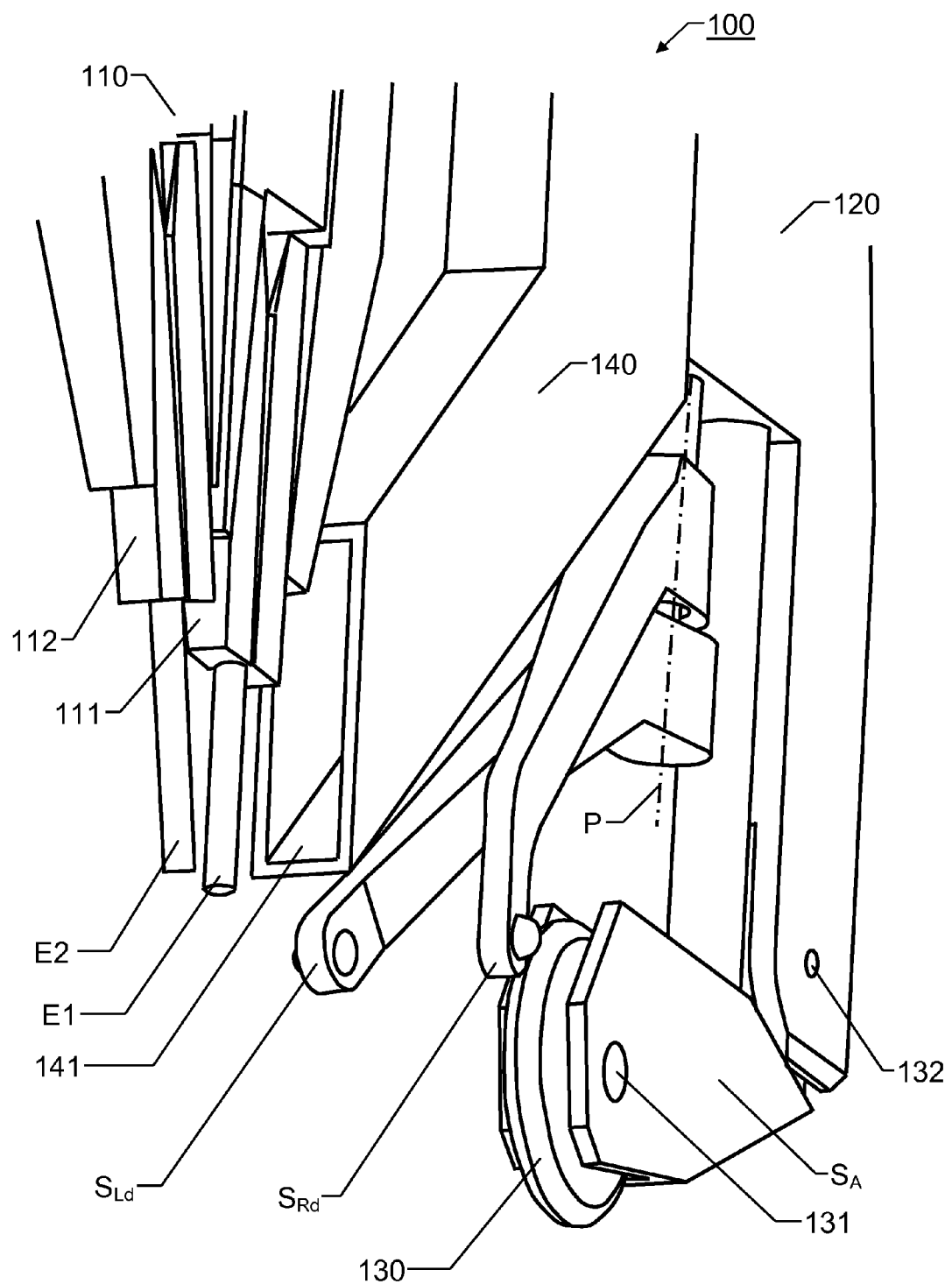
FIG. 2 shows the welding device of FIG. 1 from a different perspective.

We refer initially to FIG. 1, which shows a welding device 100 according to one embodiment of the invention. FIG. 2 shows the welding device 100 of FIG. 1, however from a somewhat different perspective.

The device 100 is adapted to apply weld material between two work pieces so as to connect these pieces mechanically with one another. The proposed device 100 includes a welding head 110 and a central element 120. According to embodiments of the invention, the device 100 may also include an auxiliary sensor means $S_A$ and/or a powder channel 140. The device 100 may further include a measurement unit 150 for registering and processing measurement data.

The welding head 110 is configured to perform a welding action in respect of the work pieces during transport of the device 100 along an operating direction. The central element 120 includes two primary sensor members $S_R$ and $S_L$ respectively, which are arranged upstream of the welding head 110 relative to the operating direction during said transport. The primary sensor members $S_R$ and $S_L$ are pivotably attached to the central element 120, and are configured to register geometric properties of a spacing between the work pieces in which spacing the weld material is to be applied. Each primary sensor member $S_R$ and $S_L$ is also configured to be in constant contact with a respective wall of the two work pieces adjoining the spacing between the work pieces. This will be elucidated below with reference to FIGS. 3 and 6.

Figure 3:
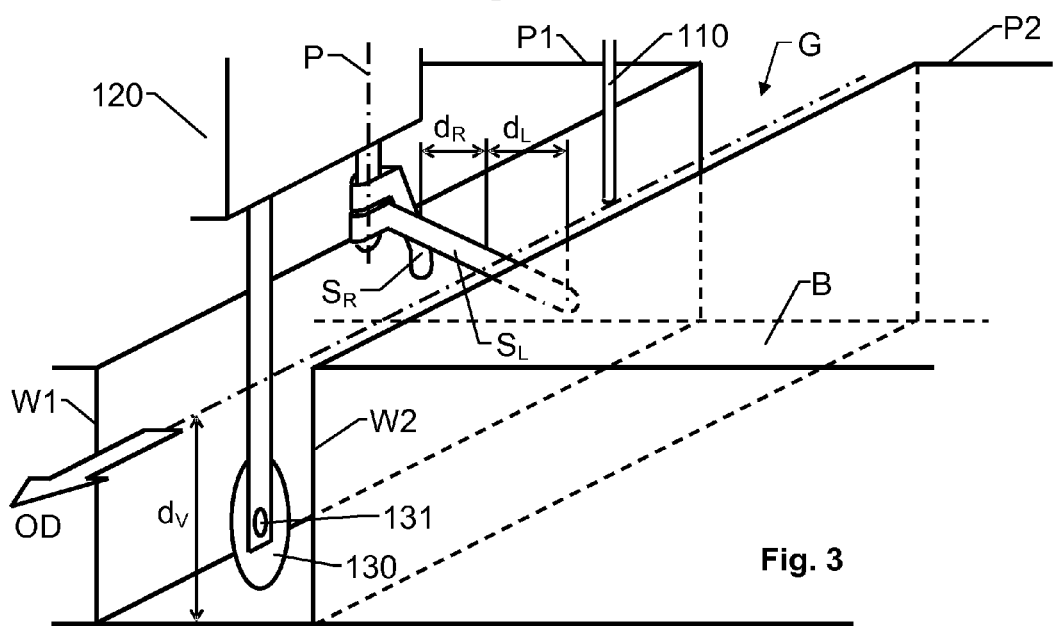
FIG. 3 illustrates schematically how a welding device according to one embodiment of the invention is operated to automatically measure a joint and apply weld material therein.

FIG. 3 illustrates schematically how a welding device according to one embodiment of the invention travels along an operating direction OD to automatically measure the geometric properties of a joint, and by means of a welding head 110, apply weld material therein in response to these measurements. Thus, the welding process mechanically connects the two work pieces P1 and P2 with one another. Each work piece P1 and P2 has a respective wall W1 and W2 facing the joint to be welded. A spacing G separates the walls W1 and W2. Consequently, the weld material is to be applied into the spacing G. A proximal end $S_{Rp}$ and $S_{Lp}$ respectively of each primary sensor member $S_R$ and $S_L$ is pivotably attached to the central element 120 via at least one pivoting axis P. In the embodiments shown in FIGS. 1, 2, 3 and 6, the primary sensor members $S_R$ and $S_L$ share a common pivoting axis in order to provide a compact design. However, according to the invention, each primary sensor member $S_R$ and $S_L$ may equally well have a separate pivoting axis. In any case, each pivoting axis P is oriented essentially perpendicular to the operating direction OD.

The primary sensor members $S_R$ and $S_L$ also have a respective distal end $S_{Rd}$ and $S_{Ld}$. According to the invention, the central element 120 is configured to control the distal ends $S_{Rd}$ and $S_{Ld}$ such that they maintain contact with the respective adjoining wall W1 and W2 during transport of the device 100 along the operating direction OD while allowing variation of lateral distances $d_R$ and $d_L$ between the central element 120 and the adjoining walls. For example, the device 100 may include one or more servo motors (not shown) that are configured to control the primary sensor members $S_R$ and $S_L$, such that these members are brought together (or are "closed") in connection with insertion of the device 100 into the joint and removal there from, and pushed against the walls W1 and W2 otherwise.

According one preferred embodiment of the invention, the device 100 is also equipped with an auxiliary sensor means $S_A$, which is configured to register a vertical distance $d_v$ between the welding head 110 and a bottom surface B of the spacing G between the work pieces P1 and P2. The auxiliary sensor means $S_A$ preferably includes a roller member 130, which is attached to the central element 120 via an axis 131.

As can be seen in the embodiments illustrated in FIGS. 1 and 2, the central element 120 may include a lever-type of design that allows the auxiliary sensor means $S_A$ to pivot around a pivoting point 132. In any case, analogous to the primary sensor members $S_R$ and $S_L$, the auxiliary sensor means $S_A$ is flexibly attached to the central element 120 and configured to maintain contact between the roller member 130 and the bottom surface B during transport of the device 100 along the operating direction OD.

The primary sensor members $S_R$ and $S_L$ may forward signals representing a respective swing-out angle of the primary sensor members $S_R$ and $S_L$ (i.e. equivalent to lateral distances $d_R$ and $d_L$ to the adjoining walls W1 and W2 respectively) to the measurement unit 150. Correspondingly, the auxiliary sensor means $S_A$ may forward a separate signal to the measurement unit 150. The measurement unit 150, in turn, may include a dedicated module 151, 152 and 153 configured to register and process each of said signals. Alternatively, a single module may handle two or more of these signals. Potentiometers in the modules 151, 152 and/or 153 may be used to determine the lateral distances $d_R$ and $d_L$ and/or the vertical distance $d_v$. One or more difference signals representing a discrepancy between a desired position of the welding head 110 and the thus determined actual position thereof can be used to control the direction(s) in which the welding head 110 is moved as the device 100 travels along the operating direction OD. Naturally, any type of position control algorithm (e.g. a PID-algorithm) may be used to control the welding head 110 movements in response to the signals produced by the primary sensor members $S_R$ and $S_L$ and the auxiliary sensor means $S_A$.

To enable powder welding, the device 100 may include a powder channel 140 that is configured introduce welding powder into the spacing G between the work pieces P1 and P2. The powder channel 140 has an outlet 141, which is arranged upstream of the welding head 110 and downstream of the primary sensor members $S_R$ and $S_L$ relative to the operating direction OD.

According one preferred embodiment of the invention, the welding head 110 is configured to administer one or more consumable electrode wires into the spacing G between the work pieces P1 and P2. FIGS. 1 and 2 show two such electrode wires E1 and E2 while the remaining Figures simply represent the welding head 110 by means of a symbolic electrode. Nevertheless, if the welding head 110 is provided with at least two wire outputs 111 and 112 configured to feed out a respective electrode, these outputs 111 and 112 are preferably arranged such that a stick-out of a first electrode E1 is angled relative to a stick-out of a second electrode E2. Namely, thereby the welding process can be made highly efficient. It is also rendered possible to further adapt the welding to the specific properties of the joint.

FIG. 4 shows a schematic perspective view of a joint between two work pieces P1 and P2. Here, the joint contains multiple weld beads b1, b2, b3 and b4. FIG. 5 illustrates how a second weld bead b2 is applied on top of a first weld bead b1 in the joint. According to one preferred embodiment of the invention, the proposed device 100 is configured to travel in the operating direction OD along at least two essentially parallel paths between the work pieces P1 and P2. Here, each path results in the application of a separate weld bead b1, b2, b3 or b4. In FIG. 5, the welding head 110 is operated to apply the second weld bead b2.

FIG. 6 shows a schematic top view of a weld device according to one embodiment of the invention. As can be seen, the welding head 110 is here offset a distance $D_{offset\text{-}lat}$ relative to the central element 120 carrying the primary sensor members $S_L$ and $S_R$. It is generally preferable to allow a position of the welding head 110 to vary relative to a position of the central element 120 because thereby the welding process can be adapted to the geometric properties of joint in a straightforward manner.

According to one preferred embodiment of the invention, the position relationship between the welding head 110 and the central element 120 is variable in at least one direction being essentially perpendicular to the operating direction OD. In the embodiment illustrated in FIG. 6, this is represented by a lateral offset $D_{offset\text{-}lat}$ from a symmetry axis of the central element 120 (i.e. shifting in a direction being essentially parallel to the bottom surface B). By thus positioning the welding head 110 leftwards in relation to the central element 120 welding in proximity to a work piece P1 on the left-hand side of the welding device 100 is facilitated, for instance to produce the second weld bead b2 in FIG. 5.

However, another preferred embodiment of the invention, the position relationship between the welding head 110 and the central element 120 may also be variable in a direction $D_{offset\text{-}vert}$ that is essentially perpendicular to both the operating direction OD and a bottom surface B of the spacing G between the work pieces P1 and P2. FIG. 7 shows a schematic side view of the weld device 100 according to such an embodiment of the invention. Consequently, the welding head 110 is here movable upwards/downwards relative to the central element 120. This is desirable because thereby the welding head 110 may be conveniently controlled to a level above the welding surface, which level is expected to result in a high-quality weld despite any unevenness bottom surface B (e.g. caused by previous weld beads in the joint). Naturally, nothing precludes that the above-mentioned lateral and vertical offsets $D_{offset\text{-}lat}$ and $D_{offset\text{-}vert}$ be combined in the same embodiment, such that the welding head 110 can be repositioned relative to the central element 120 in two dimensions. On the contrary, this desirable because it provides a very high flexibility in terms of how the welding process can be tailored to the characteristics of the joint.

FIGS. 8a and 8b illustrate how the welding head 110 may be tilted according to yet another preferred embodiment of the invention. Here, the welding head 110 is configured to be tilted around a tilt axis $A_T$, which is essentially parallel to the operating direction OD. This is advantageous, since thereby the lateral position of the welding head 110 can basically remain unchanged while the welding head 110 is aimed at specific areas in the joint, for example leftwards to produce the second weld bead b2, or rightwards to produce a third weld bead b3. Accordingly, high-precision welding is enabled in a convenient manner. To further enhance the flexibility, it is possible to combine the tilting of the welding head 110 around the tilt axis $A_T$ with the above-mentioned position variation between the welding head 110 and the central element 120 in one or more dimensions.

Although, as described above, the position and orientation interrelationship between the welding head 110 and the central element 120 may be variable in different ways, according to the invention, it is likewise possible that the welding head 110 and the central element 120 be fixed relative to one another. This is advantageous because such a relationship allows a comparatively straightforward control algorithm for the welding device 100. For example, if the adjoining walls W1 and W2 constitute essentially parallel surfaces, it is possible to employ a simple proportional control algorithm, which operates in direct response to the signals produced by the sensor members $S_R$, $S_L$ and/or $S_A$. However, if the spacing G has another cross sectional shape (e.g. a V- or a U-shape), a more complex algorithm is generally required. Namely, here it is a more demanding task to determine the distance between the welding head/electrode 110 and the relevant joint surfaces based on the signals registered by the sensor members $S_R$, $S_L$ and/or $S_A$. Naturally, if also the relationship between the welding head 110 and the central element 120 is variable in one or more dimensions and/or angles, a highly advanced algorithm may be required to control the welding device 100.

The term "comprises/comprising" when used in this specification is taken to specify the presence of stated features, integers, steps or components. However, the term does not preclude the presence or addition of one or more additional features, integers, steps or components or groups thereof.

The reference to any prior art in this specification is not, and should not be taken as, an acknowledgement or any suggestion that the referenced prior art forms part of the common general knowledge in Australia, or any other country.

The invention is not restricted to the described embodiments in the figures, but may be varied freely within the scope of the claims.

The invention claimed is:

1. A welding device for applying weld material between two work pieces so as to connect the work pieces mechanically with one another, the welding device comprising:
   a welding head configured to perform a welding action in respect of the work pieces during transport of the welding device along an operating direction; and
   two primary sensor members arranged upstream of the welding head relative to the operating direction during said transport,
   the primary sensor members being configured to register geometric properties of a spacing between the work pieces in which spacing the weld material is to be applied, and each primary sensor member being configured to be in contact with a respective wall of the two work pieces adjoining said spacing,
   a proximal end of each primary sensor member being attached to a central element of the welding device, and each primary sensor member comprises a distal end for contacting with the respective adjoining wall during transport of the welding device along the operating direction while allowing variation of lateral distances between the central element and the adjoining walls,
   wherein the central element comprises a pivoting axis around which the two primary sensor members are independently pivotable relative to one another to move the distal ends into and out of contact with the respective walls of the two work pieces, and the pivoting axis is oriented essentially perpendicular to the operating direction.

2. The welding device according to claim 1, wherein the welding device is configured to travel in the operating direction along at least two essentially parallel paths between the work pieces, each path resulting in the application of a separate weld bead.

3. The welding device according to claim 1, comprising an auxiliary sensor means configured to register a vertical distance between the welding head and a bottom surface of the spacing between the work pieces.

4. The welding device according to claim 3, wherein the auxiliary sensor means comprises a roller member, wherein the auxiliary sensor means is configured to maintain contact between the roller member and the bottom surface during transport of the device along the operating direction.

5. The welding device according to claim 1, wherein the welding device is configured to vary a position of the welding head relative to a position of the central element.

6. The welding device according to claim 5, wherein the position relationship between the welding head and the central element is variable in at least one direction being essentially perpendicular to the operating direction.

7. The welding device according to claim 6, wherein the position relationship between the welding head and the central element is variable in a direction essentially perpendicular to a bottom surface of the spacing between the work pieces.

8. The welding device according to claim 1, wherein the welding head is configured to be tilted around a tilt axis being essentially parallel to the operating direction.

9. The welding device according to claim 1, comprising a powder channel configured apply welding powder in the spacing between the work pieces, the powder channel having an outlet which is arranged upstream of the welding head and downstream of the primary sensor members relative to the operating direction during said transport.

10. The welding device according to claim 1, wherein the welding head is configured to administer at least one consumable electrode wire into the spacing between the work pieces.

11. The welding device according to claim 10, wherein the welding head comprises at least two wire outputs configured to feed out a respective electrode, the outputs being arranged such that a stick-out of a first electrode is angled relative to a stick-out of a second electrode.

12. The welding device according to claim 1, further comprising a servo motor configured to control movement of the primary sensor members.

13. The welding device according to claim 12, wherein the servo motor is configured to controllably bias the primary sensor members against the respective walls of the work pieces.

14. The welding device according to claim 1, wherein the primary sensor members forward signals representing respective swing-out angles to a measurement unit that determines, based on the signals, distances between the central element and the respective walls of the work pieces.

* * * * *